March 5, 1935.  J. F. TANNER  1,993,693
APPARATUS FOR DELIVERING PREDETERMINED QUANTITIES
OF GRANULAR OR PULVERULENT MATERIAL
Filed Oct. 2, 1933
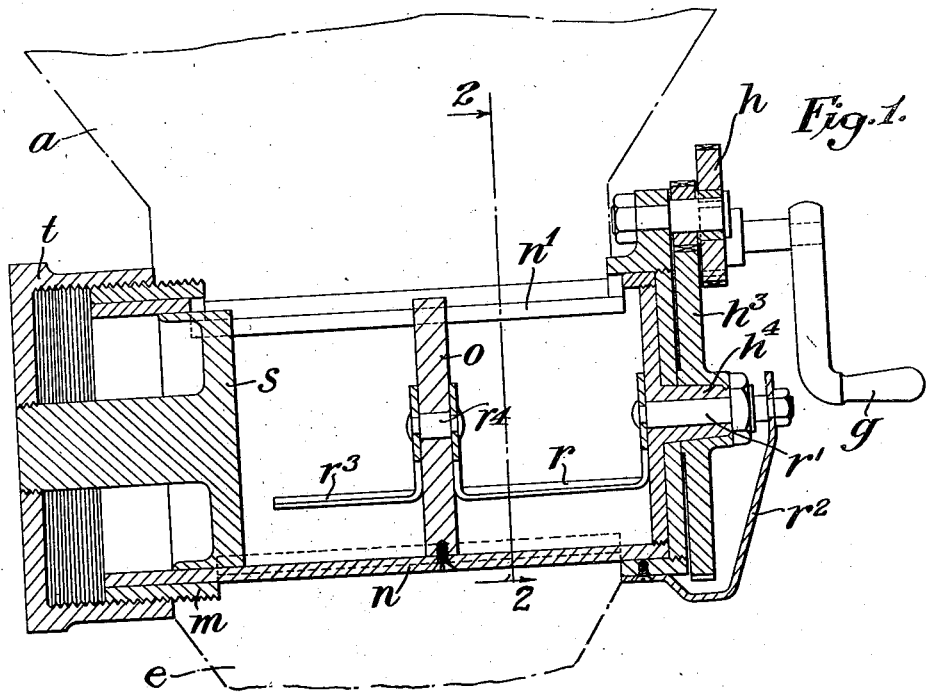
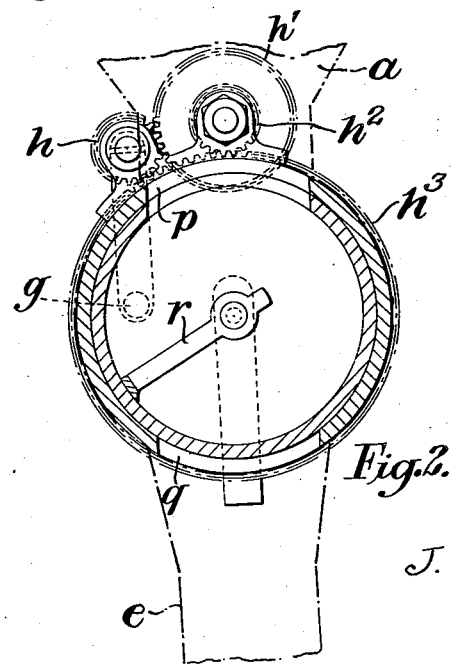
J. F. Tanner
INVENTOR
By: Marks & Clerk
ATTYS.

Patented Mar. 5, 1935

1,993,693

UNITED STATES PATENT OFFICE 1,993,693

APPARATUS FOR DELIVERING PREDETERMINED QUANTITIES OF GRANULAR OR PULVERULENT MATERIAL

James Frederick Tanner, Bristol, England

Application October 2, 1933, Serial No. 691,887
In Great Britain August 19, 1933

4 Claims. (Cl. 221—107)

This invention relates to apparatus for delivering predetermined quantities of granular or pulverulent material and has for its object to devise simple and efficient apparatus which will be particularly applicable to such operations as the weighing of sugar, tea, or the like by a retail grocer or shopkeeper although it will be understood that the invention is adapted for any similar operation for which its use may be indicated.

The object of the present invention is to provide an improved form of apparatus of the above character, and the invention consists in apparatus comprising a hopper for the material to be delivered, an outlet chute for the delivery of the material, a rotary horizontal measuring cylinder between said hopper and said chute and having a port adapted to register alternately with the opening from the hopper and the opening into said chute and a scraper adapted to engage the cylindrical wall of the measuring chamber so as to free the same of adherent material during rotation of the measuring chamber.

Further features of the invention will be apparent from the description given hereafter.

The accompanying drawing illustrates one mode of carrying out the invention.

Figure 1 is a part sectional elevation of one convenient form of apparatus in accordance with the invention and Figure 2 is a section on the line 2—2 of Figure 1.

In carrying my invention into effect in one convenient manner as illustrated in Figures 1 and 2 and when producing, for example, an apparatus which may deliver sugar or the like in 1 lb. or 2 lb. lots I form my improved apparatus with a hopper or other like receptacle $a$ into which the sugar or other material is charged and at the lower part of the hopper I provide two horizontal cylinders, an outer fixed cylinder or sleeve $m$ and an inner rotary cylinder or sleeve $n$. The measuring cylinder $n$ is divided into compartments by an internal partition $o$ and the compartments are furnished with an inlet opening $n^1$ which cooperates alternately with an inlet opening $p$ in the outer cylinder communicating with the hopper $a$ and with an outlet opening $q$ communicating with the feed chute (not shown). I prefer to provide means in known manner for adjusting the capacity of one compartment or chamber so as to adjust the same so that it may be made accurately to hold a weighed quantity of material (say 1 lb.) while the same adjustment will also serve to adjust the combined capacity of the two chambers when 2 lb. lots of material are to be delivered. Once the adjustment has been made, the apparatus can be used to deliver any number of the accurately weighed lots. The adjustment may also be needed when dealing with materials of different densities. Thus in the particular construction shown the adjustment of the compartment or compartments may be effected by a movable wall member $s$ operated by a screw cap $t$ threaded on to the outside of the outer cylinder $m$, the adjacent scraper being shortened to permit of the movement of the member $s$.

Further I may provide a damper or other device adapted to shut off one compartment when a single compartment or chamber only is to be used. The arrangement is such that the compartments (or one only if the other be not required) are first filled from the hopper and after a half-revolution of the inner cylinder, then emptied into the chute.

Rotation of the inner sleeve or cylinder may be effected by the crank $g$ to which is rigidly secured a pinion $h$ meshing with a pinion $h^1$ to which is rigidly secured a pinion $h^2$ which in turn meshes with a pinion $h^3$ mounted upon the sleeve $h^4$ of the cylinder or sleeve $n$.

The scraper $r$ is rigidly secured to a fixed bearing $r^1$ carried from the frame of the machine by a bracket $r^2$ and upon which bearing $r^1$ the shaft trunnion $h^4$ of the cylinder or sleeve $n$ can freely rotate. The scraper $r^3$ in the second compartment is likewise rigidly secured to the scraper $r$ by means of a bearing $r^4$ upon which the partition $o$ is freely rotatable so that it will be seen that while the measuring chamber $n$ is arranged to be freely rotatable, the scrapers $r$ and $r^3$ will remain fixed and will thus free the wall of the measuring compartments from adhesive material without, however, obstructing the free passage of the material into and out of the measuring compartments.

If desired, that part of the apparatus lying between the bottom of the hopper $a$ and the upper part of the feed chute $e$ is covered in by a suitable casing (leaving only the operating handle $g$ and adjusting screw member $t$ exposed).

Having now described my invention, what I claim as new and desire to secure by Letters Patent is:—

1. Apparatus for delivering predetermined quantities of granular or pulverulent material comprising a hopper for the material to be delivered, an outlet chute for the delivery of the material, a measuring cylinder between said hopper and said chute rotatable about a horizontal axis and having a port adapted to register alternately with the opening from the hopper and the opening into said chute and a scraper fixedly secured in a position intermediate the hopper and the chute openings and engaging the cylindrical wall of the measuring chamber so as to free the same of adherent material during rotation of the measuring chamber.

2. Apparatus as claimed in claim 1 having a movable end wall in said measuring cylinder for the purpose of adjusting the capacity of said cylinder.

3. Apparatus as claimed in claim 1 having a partition dividing said measuring chamber into two compartments and a scraper in each of said compartments.

4. Apparatus for delivering predetermined quantities of granular or pulverulent material comprising a hopper into which the material is loaded, a rotary horizontal cylinder into which the material is charged in measured quantity and from which it is discharged to a chute, a partition dividing said horizontal measuring cylinder into two compartments, a fixed scraper in each of said compartments adapted to engage the cylindrical wall of the same, means for rotating the measuring chamber and a screw-operated movable wall for varying the capacity of said measuring chamber.

JAMES FREDERICK TANNER.